United States Patent
Cheng

(10) Patent No.: US 7,616,816 B2
(45) Date of Patent: Nov. 10, 2009

(54) SYSTEM AND METHOD FOR MISSION-DRIVEN VISUAL INFORMATION RETRIEVAL AND ORGANIZATION

(75) Inventor: Hui Cheng, Bridgewater, NJ (US)

(73) Assignee: Sarnoff Corporation, Princeton, NJ (US)

( * ) Notice: Subject to any disclaimer, the term of this patent is extended or adjusted under 35 U.S.C. 154(b) by 107 days.

(21) Appl. No.: 11/688,433

(22) Filed: Mar. 20, 2007

(65) Prior Publication Data
US 2008/0021879 A1   Jan. 24, 2008

Related U.S. Application Data

(60) Provisional application No. 60/783,916, filed on Mar. 20, 2006.

(51) Int. Cl.
*G06K 9/00*   (2006.01)

(52) U.S. Cl. .......................................... 382/181; 707/3

(58) Field of Classification Search ................ 382/100, 382/109, 181, 201; 707/1, 3, 4, 5, 6, 100, 707/101

See application file for complete search history.

(56) References Cited

U.S. PATENT DOCUMENTS

| | | | | |
|---|---|---|---|---|
| 5,652,717 A * | 7/1997 | Miller et al. | ..................... | 703/6 |
| 5,802,361 A * | 9/1998 | Wang et al. | .................. | 382/217 |
| 5,991,460 A * | 11/1999 | Mitchell | ..................... | 382/278 |
| 6,112,172 A * | 8/2000 | True et al. | .................... | 704/235 |
| 6,774,917 B1* | 8/2004 | Foote et al. | ................... | 715/700 |
| 2004/0004663 A1* | 1/2004 | Kahn et al. | ............... | 348/207.1 |
| 2004/0004737 A1* | 1/2004 | Kahn et al. | ................ | 358/1.15 |
| 2004/0126038 A1* | 7/2004 | Aublant et al. | .............. | 382/305 |
| 2006/0122776 A1* | 6/2006 | Knowles et al. | ............. | 701/226 |
| 2007/0115373 A1* | 5/2007 | Gallagher et al. | ........ | 348/231.3 |

* cited by examiner

*Primary Examiner*—Anand Bhatnagar
(74) *Attorney, Agent, or Firm*—Lowenstein Sandler PC

(57) ABSTRACT

The present invention provides a virtual data collection system and method that provides an image analyst with full-control of the image, including the ability to retrieve and reorganize information from an existing video database of images. The system provides for the search and retrieval of information from previously collected images, and reorganize them to meet new or revised mission objectives. The system also enables quick access of the "right" information through virtual data collection from the existing video database.

21 Claims, 2 Drawing Sheets

SYSTEM AND METHOD FOR MISSION-DRIVEN VISUAL INFORMATION RETRIEVAL AND ORGANIZATION

CROSS-REFERENCE TO RELATED APPLICATIONS

This application claims the benefit of U.S. Provisional Application No. 60/783,916 filed on Mar. 20, 2006, which is herein incorporated by reference in its entirety.

GOVERNMENT RIGHTS IN THIS INVENTION

This invention was made with U.S. government support under contract number HM1582-04-C-0010. The U.S. government has certain rights in this invention.

FIELD OF THE INVENTION

This invention generally relates to the field of interactive video processing for automatically locating videos of specific content. Specifically, the present invention pertains to mission-driven visual information for indexing, filtering, searching, retrieval and re-organization of the video images.

BACKGROUND OF THE INVENTION

Today, a huge amount of image and video, especially aerial videos (videos captured from aerial platforms), are collected daily. Although these videos are stored, they are seldom re-used because of the difficulty of retrieving relevant visual information from videos collected for other purposes. Currently, when a user must use these videos to extract information, since the user has no control of how the video was collected, the user has to watch the video, all of them, to pick out what he/she needs. This manual searching, filtering and selection process is extremely labor intensive and it can not meet the needs of handling the volume, velocity of both existing and future data collection capabilities.

Although there are some initial attempts to provide computer-assisted video retrieval by filtering the metadata associated with a video sequence, these attempts only provide filtering capabilities based on location (latitude and longitude) and time. In addition, these approaches only retrieve clips of the original videos as how they are collected. There is no re-organization of the visual information, such as video frames, according to the current mission objective.

Thus, there is need in the art to provide to provide a system and method that provides an image analyst with full-control of the video images, including the ability to retrieve and reorganize information from an existing video database of images.

SUMMARY OF THE INVENTION

The present invention provides a method for interactive searching and retrieval of at least one video image stored in a database having a collection of video images. The method comprise defining at least one parameter applicable to geo-spatial location of the image of interest, generating at least one query based on said parameter and searching the database in accordance with the query to retrieve video frames of the image of interest. The method further comprises providing a virtual image sensor to the user to control the retrieved video frame displayed to the user.

The present invention provides a system for searching and retrieval of at least one video image stored in a database having a collection of video images. The system comprise an interactive search and retrieval (IS&R) module for defining parameters applicable to geo-spatial location of the image of interest. The module comprise a virtual image sensor having controls. The system also comprise a query generation (QG) module for generating at least one query based on said parameters and a processor for searching the database in accordance with the query to retrieve video frames of the image of interest. The system further comprises an adaptive ranking (AR) module for ranking and organizing the retrieved video frames.

DETAILED DESCRIPTION OF THE INVENTION

The present invention is a mission-driven visual information retrieval and reorganization system and method that provide a user with the full control to explore the visual information embedded in the videos collected for various different tasks. This system also intelligently ranks the information collected by the virtual image sensor and reorganize them for different exploitation needs. The details of the present invention are described herein below.

Figure 1:
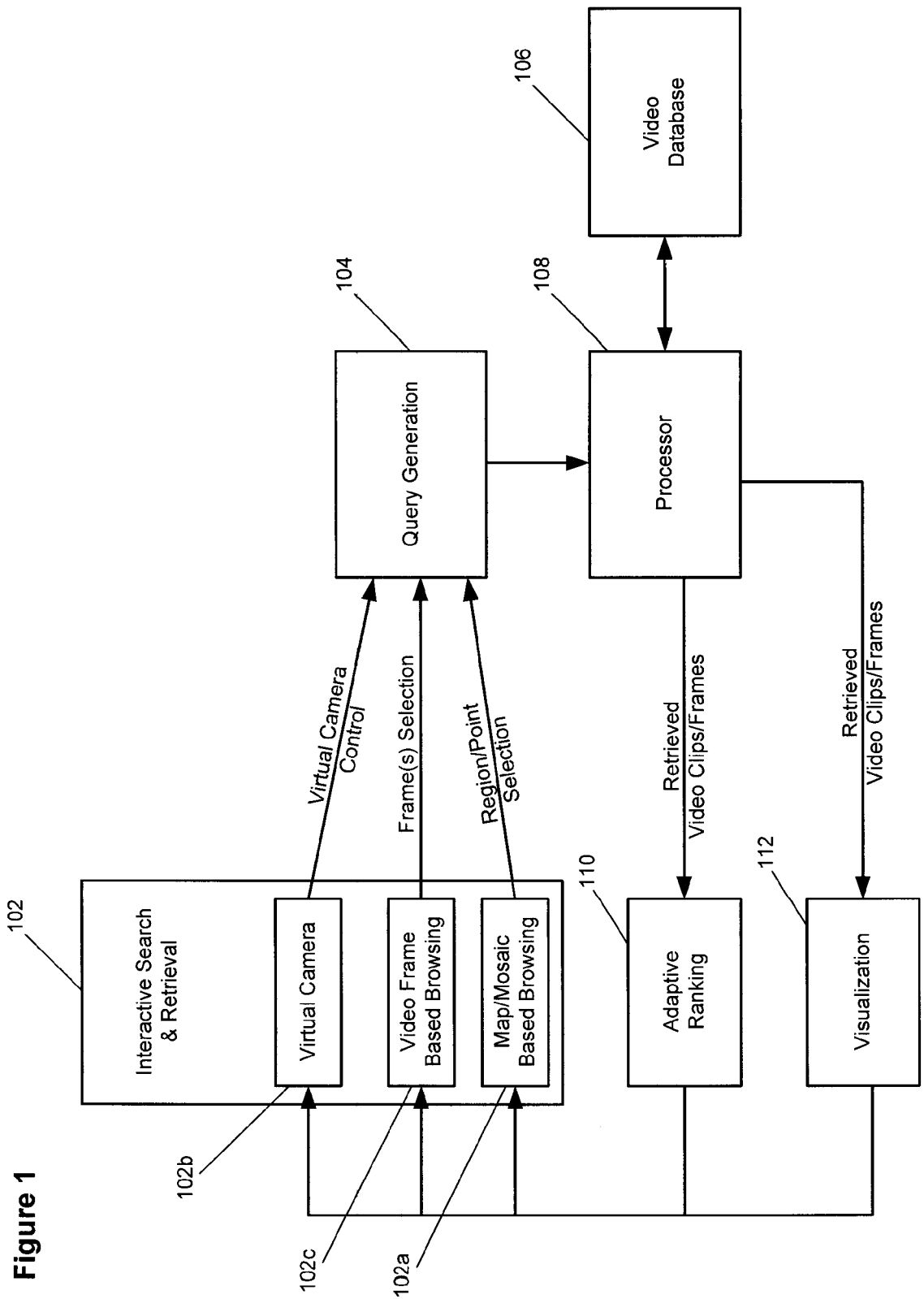
FIG. 1 depicts an illustration of a block diagram of a mission-driven visual information retrieval and reorganization system in accordance with one embodiment of the present invention.

Referring to FIG. 1, there is shown a computer implemented mission-driven visual information retrieval and organization (MDVIRO) system 100 of the present invention. The system 100 comprises an interactive search & retrieval (IS&R) module 102 as an interface to the user to interact with the system. The IS&R module 102 is coupled to a query generation (QG) module 104 to provide the parameters selected and controlled by the user. The query generation module (QG) 104 utilizes these parameters to generate queries of the original video clips/frames stored in a video database 106. The queries generated by QG module 104 is applied to the video database 106 by a computer implemented processor 108 as shown in FIG. 1. The processor 108 is coupled both to the QG 104 and video database 106 to utilize the query from QG 104 to search the database 106 in order to generate the query results comprising retrieved video clips/frames. Note that the processor 108 is shown as a separate component however, it may preferably be part of the IS&R module 102. The system 100 also comprises an adaptive ranking (AR) module 110 coupled to both the IS&R module 104 and the processor 108. The AR model 110 reorganizes the retrieved video clips from the processor 108 and further interacts with the user via the IS&R module 104 to provide the reorganized retrieved video clips or frames to the user to refine their query or control. The system 100 further comprises a visualization module 112 coupled to the processor 108 to form a histogram of every retrieved video clip and further provide the same to the user via the IS&R module 102. The components of the MDVIRO system 100 will be described in greater detail herein below.

To rank query results and filter un-wanted frames, various quality measures from the video frames stored in the video database 106 are computed. Although these may not be ratings of the National Imagery Interpretation Rating System (NIIRS), they can preferably be used to filter out images that can't reach the desired NIIRS rating. These quality measures include blur measure that is computed using energy distribution as a function of spatial frequency and local gradient of luma or chroma (edge); cloud coverage computed using image segmentation; average contrast and average brightness; sensor moving speed; sensor slant angle and noise level computed using of energy of specific spatial frequency band. Each quality measure is normalized to 0-1 and the quality of a frame is the maximal of six measures. Thus, the quality measures of a video frame is pre-computed and stored in the video clip/frame ingested into database 106.

Figure 2:
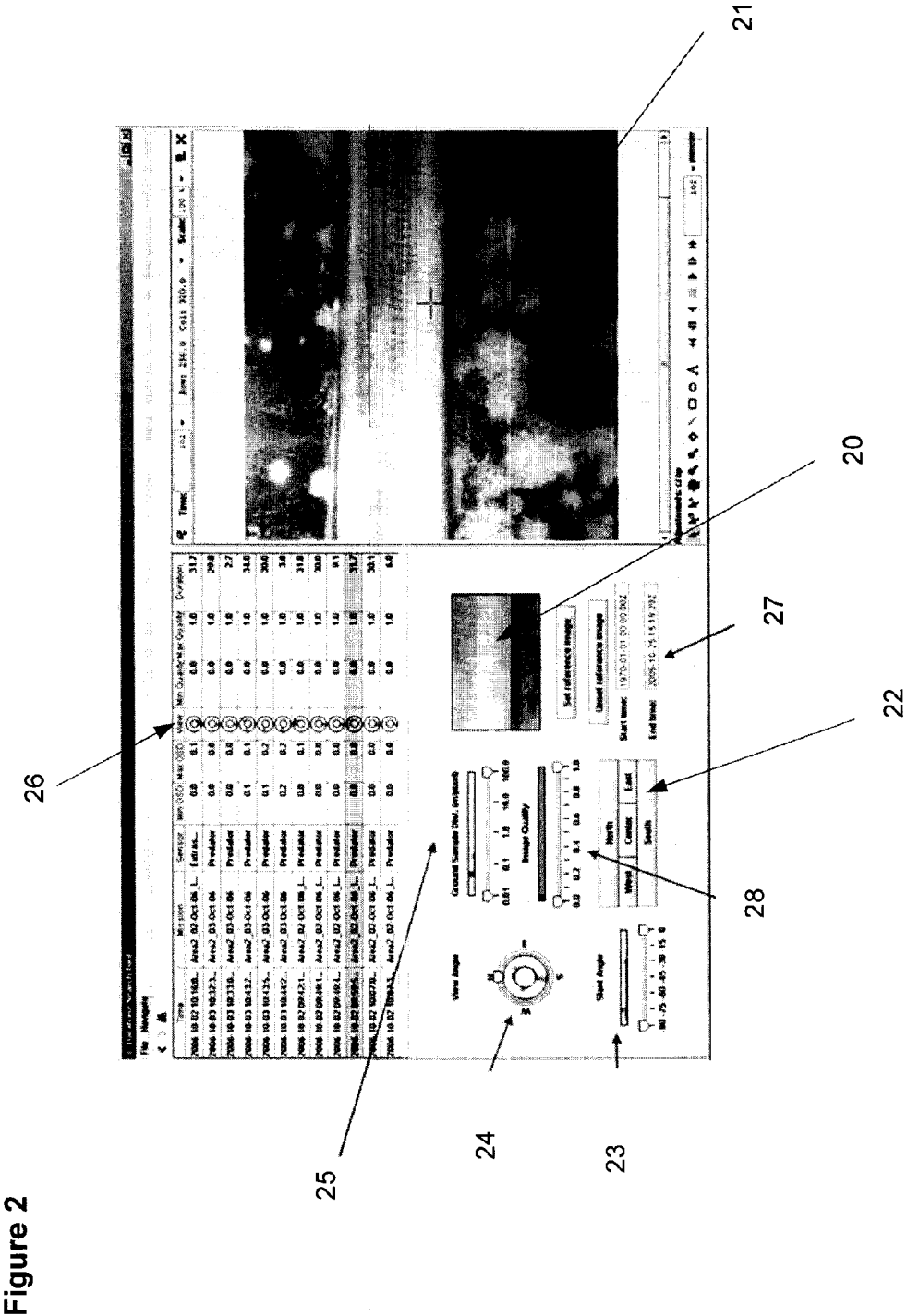
FIG. 2 depicts an exemplary graphical user interface for interactive search and retrieval module in accordance with another embodiment of the present invention.

FIG. 2 illustrates a graphical user interface for IS&R module 102 of FIG. 1. The IS&R module 102 provides three ways for a user to interact with the MDVIR2 system 100. One such approach is via map/mosaic based browsing component 102*a*. This is used to view a geo-spatial area to identify regions or objects of interest in those regions. It is preferably used as the first step to start the interactive search & retrieval. In this case, an existing map or a reference image 20 as shown in FIG. 2 or a video mosaic generated by video clips are used for a user to define area of interest (AOI) and to provide spatial context for generating spatial query, such as arbitrary shaped regions, lines or points. The resulting spatial entities, region, line or point are converted by QG model 104 into queries. The processor 108 then uses these queries to search the video database 106 and provides search results of retrieved video clips/frames. Search results can also be used to generate a mosaic and then are used to update the video mosaic used for AOI selection for further selection process, such as refine the AOI defined before or generate new a AOI. For example, when used as an geographical information system (GIS) plug-in, the map/mosaic based browsing component 102*a* allows a user to define a region, such as a arbitrary polygon or a arbitrary polyline, and find all video clips that their footprint intersect with the defined region. This provides an intuitive and easy-to-user search and retrieval system that allows a user to define an area of interest (AOI) by drawing an arbitrary shaped region or select existing geospatial features, such as GIS vector data, and retrieve video frames or clips intersect with the AOI.

Another approach for a user to interact with the MDVIR2 system 100 is provided in the IS&R module 102 via means of a virtual image sensor such as a camera 102*b*. The virtual camera will provide typical camera control to change the field-of-view of the video clip/frame given an initial selection, using the map/mosaic based browsing component 102*a* or video frame based browsing component 102*c* (described in detail below). Thus, the video clip/frame selected by the user, either by map/mosaic based browsing or video frame based browsing, will be now be utilized by the user to perform one or more functions of the virtual camera. As shown in FIG. 2 is the video clip 21 of one of many images selected by the user. Also shown in FIG. 2, is the virtual camera 102*b* having the same controls as the typical camera to perform the functions. Such controls include pan 22, i.e. latitude and longitude of center of the field-of-view, tilt 23, i.e. camera pitch angle or slant angle, sensor heading 24, i.e. camera viewing direction, such as from north, south, east or west; zoom 25, i.e. ground sampling distance, sensor ground speed or sensor distance from the ground etc. These controls will assist the user to retrieve video frames with the exact location, view angle and other desired parameters based on the reference video frame or the current displayed video frame. For example, if one sees a house in a video frame, he/she can turn the view angle control or sensor heading 24 to look for video frames illustrating the back-side of the house. Additionally, there is provided another control, start/end time, 27 to filter video frames/clips according to time acquisition. This control can explicitly set a range of time of the images to be queried. Note, this control can preferably also be utilized at the map/mosaic browsing module 102*a*. Thus, it provides an intuitive and easy-to-user search and retrieval system that allows a user to search, browse, filter and retrieve relevant information for accomplishing a task, such as video clips or frames regarding to object, moving object tracks, object activities and events of interest, as if he or she controls a surveillance camera to capture the information he/she needs.

An additional approach for a user to interact with the MDVIR2 system 100 is provided in the IS&R module 102 via video frame based browsing 102*c*. A user generally uses this option to go through a large number of video frames of a large area that may change significantly due to time of the day, season, construction or other significant events to identify video frames of interest. Search results, i.e. retrieved video frames as a results of Virtual Camera 102*b* or Map/Mosaic based browsing component 102*a* are organized according to their similarities determined by various parameters such as color, texture, edge, object, semantic meaning of objects. Similar video frames are clustered and a representative frame is chosen to represent each cluster. Each cluster can be further partitioned in the sub-clusters using the same cluster algorithm but different clustering threshold. A user will first view the representative images of all clusters and then view representative image of sub-clusters until he or she finds the image or images of interest. For example, dominant colors, texture description such as quantized oriented filter responses at different directions and scales, edge such as histograms of edges in non-overlapping windows and the Histogram Of Gradient (HOG), moments of segmented regions and classes of segmentation objects are clustered using algorithms, such as K-mean or mixture-of-Gaussian (MoG) algorithm widely used for data clustering. Both the K-mean and MoG algorithms are well known in the art to cluster of objects based on based on attributes. Then, the video frame that is closest to the centroid of each cluster is used to represent that cluster and shown to a user. If a user select a cluster, the cluster will be further divided into sub-clusters and the video frames representing each sub-cluster will be shown to the user until the user finds all video frames of interest.

Referring back to FIG. 1, the query generation (QG) module 104 receives the selection and control parameters from the three components 102*a*, 102*b* and 102*c* of the Interactive Search and Retrieval module 102 described above to automatically generate queries of basic attributes of a video clip. Such attributes include location (i.e. latitude and longitude), time, view angle, slant angle, resolution (ground sampling distance) and video quality of the video image. For example, Map/Mosaic based Browsing and Video Frame based Browsing will provide queries on location, such as latitude (lat) and longitude (long). Virtual camera controls will generate queries on latitude, longitude, view angle, resolution, slant angle and etc. For example, when a user selects a video frame as the reference video frame 20, and he/she uses virtual panning (pan 22) to the left, then the new query will be generated by the QG 104. The new query will comprise the new latitude and longitude of the video clip as the result of current latitude and longitude plus a pre-defined step used for virtual pan. So, for example, if the video frame retrieved contains only half of building on the left side of the video frame and the other half is outside of the video frame, the user can thus use "virtual pan" 22 control to refine the query generated behind the scene and retrieve video frames, if exists, containing the whole building. Similarly, if a user dials the sensor 24 heading to north, a new query result containing for sensor heading equal to 0 degree will be generated. The virtual zoom 25 will result in queries on corresponding group sampling distance. Thus it provides an intuitive and easy-to-user search and retrieval system that allows a user to define and refine his/her query intuitively based on the content of the information, such as video clips or video frames, retrieved from the database 106 by the processor 108.

The queries results generated through the processor 108 can be many. Therefore, in a preferred embodiment of the present invention, the adaptive ranking module 110 is needed to organize/re-organize the queries results to best fit the need of a user. This is especially important for the virtual camera based display. One of the controls of the virtual camera 102c is image quality 28 which is utilized by AR 110 to filter video frames with blur and/or cloudy coverage 28. For virtual camera 102c based searching and browsing, the query results are ranked preferably as a function of ten variables (x1) latitude, (x2) longitude, (x3) time, (x4) viewing angle, (x5) slant angle, (x6) ground-sampling distance, (x7) video or video frame quality measure, (x8) result of intention estimation, a floating point number indicate the level of importance of a location, (x9) object detection and classification, a list of objects and their classes and (x10) previous user actions, the list of variables among x1 and x7 that a user has adjusted. Furthermore, dx1, dx2, ..., dx9 are denoted to the L1 distance between the query based on the reference frame and the attributes of a frame retrieved, where a frame is retrieved if all dxN (N=1, 2, ... 9) are less than a normalized threshold. Note, for dx9 is the number of different objects between the reference frame and the retrieved frame. We also define dx(n, 10)=1 if the variable has been adjusted by user, dx(n, 10)=0 if not.

The rank K for a video frame is $$K=s1*[1+y1*dx(1, 10)]*F1(dx1)+s2*[1+y2*dx(2, 10)]*F2(dx2)+ \ldots +s9*[1+y9*dx(9, 10)]*F9(dx9)$$

Where s1, s2, ..., s9 are the scale factor or importance of that variable. For example, s3, the importance factor of time is generally higher than s5, the importance of the slant angle. FN(dxN) is the thresholding function. FN(dxN) is dxN is dxN is less the pre-defined threshold T_N, otherwise FN(dxN) is positive infinity. yN is the importance after the variable is adjusted by user.

For example, when a user is adjusting one variable, e.g. x3 view angle, from the above list using virtual camera control, among all frames that satisfy the query, the above ranking algorithm will give higher priorities to those frames that have smaller differences, such as weighted L2 norm of customized differences for each variable or parameter, for other variables or parameters. If a variable or parameter has been adjusted by the user before, that variable or parameter will have a higher weighting in the difference calculation then those variables or parameters that have not be en adjusted before.

The difference calculations for different variables are different. For example, the quality measure of a video frame will be compared with a threshold of pre-defined acceptable quality. If a video has acceptable quality, the difference is small, such as 0. Otherwise it will be a pre-defined large number. For latitude and longitude, the difference will be the L2 norm if a location is contained in the previous video frame. Otherwise, it will be pre-defined infinity as defined in F7(dx7).

Thus, the adaptive ranking 110 provides capability to rank and organize/re-organize retrieved images according to the content of the image, such as the similarity of the image, metadata of the image, and the history of the controls of the virtual camera 102c or the history of the queries before presenting the results to the user. For example, when there are two images covering the same area, the adaptive ranking module 110 will rank/show the one captured more recently and/or with higher quality first.

To visualize the availability of wide frames of certain characteristics, a plot of the histogram of video frames of all available controls of the virtual camera 102c can be preferably be computed by the visualization module 112 in the system 100. For example, as shown in FIG. 2, the histograms of view angles 24, ground sampling distance 25 and quality measures 28 are plotted for all clips retrieved by a query. After a frame is selected, its corresponding bin will be highlighted. Additionally, bins of a histogram that have 0 hit and those have 1 hit will be visually differentiated. These will be preferably plotted using either visible color differences or height differences and provided to the user as a "view" 26 via the graphical user interface in FIG. 2. The visualization is performed to every video clip retrieved by the processor 108 for the query generated according to IS&R module 102

A user preferably is given a choice of either to play all video frames that satisfy the search criterion as a single video clip by concatenating these frames based on adaptive ranking or play the original video clip containing the frame that satisfy the search criterion as discussed above. Either way, the user can find the video clips or video frames comprising the information, such as objects, area, object activities and events several magnitude more effectively and efficiently with the method and system of the present invention.

Thus, the present invention provides many advantages. Some of these include the ability for a user to find and retrieve relevant information several magnitude faster than what he/she can do using existing systems. It is much easier for a user to refine his/her query according to the videos retrieved. It is much easier for a user to retrieve videos according to the area of interest (AOI). Moreover, the ranking algorithm helps a user to filter less relevant information by lowering their ranks and promote more relevant information by increasing their ranks in an intelligent way. Therefore, further reduce the amount of time needed for finding the information a user needs.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A method for interactive searching and retrieval, of at least one video image stored in a database having a collection of video images, the method comprising:
    providing to a user a reference image to define an area of interest and a spatial context of the reference image;
    defining at least one parameter applicable to geo-spatial location of the image of interest;
    generating at least one query based on said parameter;
    searching the database in accordance with the query to retrieve video frames of the image of interest;
    ranking and organizing the retrieved video frames; and
    refining the query based on the ranked and the organized video frames.

2. The method of claim 1 wherein said video image is an aerial video image.

3. The method of claim 1 further comprising classifying the retrieved video frames to create clusters of similar video frames.

4. The method of claim 1 further comprising providing a plurality of parameters to the user and generating a query based on the parameter selected by the user.

5. The method of claim 4 wherein said parameters comprise area of interest, spatial context, color, texture, edge, object, semantic meanings of objects, sensor controls and combinations thereof.

6. The method of claim 5 wherein said sensor controls comprise field-of-view, sensor angle, sensor heading, ground sampling distance, sensor ground speed and combinations thereof.

7. The method of claim 1 further comprising providing a histogram of said parameters for the retrieved video clips.

8. The method of claim 1 further comprising providing a virtual image sensor to the user to control the retrieved video frame displayed to the user.

9. The method of claim 8 wherein said ranking and organizing the retrieved video frame is based on how the virtual image sensor is controlled by the user.

10. The method of claim 8 wherein said ranking and organizing the retrieved video frame is based on history of controls of the virtual image sensor utilized by the user.

11. The method of claim 1 wherein said ranking and organizing the retrieved video frame is based on content of said retrieved video image.

12. The method of claim 1 wherein said ranking and organizing the retrieved video frame is based on metadata of the image.

13. The method of claim 1 wherein said ranking and organizing the retrieved video clip is based on history of the queries.

14. A system for searching and retrieval of at least one video image stored in a database having a collection of video images, the system comprising:
    an interactive search and retrieval (IS&R) module for defining parameters applicable to geo-spatial location of the image of interest; wherein said IS&R module comprise a map/mosaic based browsing component for providing to a user a reference image to define an area of interest and a spatial context of the reference image
    a query generation (QG) module for generating at least one query based on said parameters;
    a processor for searching the database in accordance with the query to retrieve video frames of the image of interest; and
    an adaptive ranking (AR) module for ranking and organizing the retrieved video frames and refining the query based on the ranked and the organized video frames.

15. The system of claim 14 wherein said video image is an aerial video image.

16. The system of claim 15 wherein said IS&R module comprise a video frame based browsing component for providing to the user a cluster of similar video frames to locate the image of interest.

17. The system of claim 15 further comprising virtual image sensor having controls that function to edit the view of the video frame initially selected by the user based one of the map/mosaic based browsing component or video frame based browsing component.

18. the system of claim 17 further comprising a visualization module to display information regarding the video frame, said information comprise a histogram of video frames of said controls of the sensor.

19. The system of claim 14 wherein said retrieved video frame is organized based on one or more of factors comprising content of said retrieved video image, metadata of the image, how the virtual image sensor is controlled by the user, history of the controls of the virtual image sensor, history of the queries.

20. The system of claim 14 wherein said reference image is a map image.

21. The system of claim 14 wherein said reference image is a mosaic image.

* * * * *